US008947856B2

(12) United States Patent
Wang et al.

(10) Patent No.: US 8,947,856 B2
(45) Date of Patent: Feb. 3, 2015

(54) SUPERCAPACITOR AND METHOD FOR FORMING THE SAME

(75) Inventors: Lian Wang, Taipei (TW); Tar Li Hsieh, Yangmei (TW)

(73) Assignee: Ultracap Technologies Corp., Hsinchu (TW)

( * ) Notice: Subject to any disclaimer, the term of this patent is extended or adjusted under 35 U.S.C. 154(b) by 142 days.

(21) Appl. No.: 13/455,775

(22) Filed: Apr. 25, 2012

(65) Prior Publication Data

US 2012/0275082 A1 Nov. 1, 2012

(30) Foreign Application Priority Data

Apr. 28, 2011 (TW) .............................. 100114761 A

(51) Int. Cl.
*H01G 9/00* (2006.01)
*H01G 5/38* (2006.01)
*H01G 11/12* (2013.01)
*H01G 11/72* (2013.01)
*H01G 11/76* (2013.01)
*H01G 11/28* (2013.01)

(52) U.S. Cl.
CPC .............. *H01G 11/12* (2013.01); *H01G 11/72* (2013.01); *H01G 11/76* (2013.01); *H01G 11/28* (2013.01); *Y02T 10/7022* (2013.01); *Y02E 60/13* (2013.01)
USPC ............................. 361/522; 361/502; 361/541

(58) Field of Classification Search
USPC ............. 361/502, 328.33, 328, 330, 522, 541
See application file for complete search history.

(56) References Cited

U.S. PATENT DOCUMENTS 5,012,385 A * 4/1991 Kurabayashi et al. ........ 361/328
6,790,556 B1 * 9/2004 Meitav et al. ................. 429/210

FOREIGN PATENT DOCUMENTS

| TW | I281281 | 5/2007 |
| TW | I299875 | 8/2008 |
| TW | 200837786 | 9/2008 |

OTHER PUBLICATIONS

Taiwan Search Report for Taiwan Application No. TW100114761, received from Foreign Associate Apr. 25, 2014. English translation not provided.

* cited by examiner

*Primary Examiner* — Dion R Ferguson
(74) *Attorney, Agent, or Firm* — Patterson Thuente Pedersen, P.A.

(57) ABSTRACT

A supercapacitor including at least one first electrode substrate having a surface coated with an active material, and at least one second electrode substrate having a surface coated with the active material, wherein the at least one first electrode substrate has a polarity reverse to that of the at least one second electrode substrate. The at least one first and second electrode substrates are stacked in an alternating arrangement. A plurality of the first electrode substrate having the same polarity or a plurality of the second electrode substrate having the same polarity is connected in parallel. The at least one first and second electrode substrates include stacking portions each having opposite surfaces arranged with a frame-shaped insulating ring. An electrolyte is accommodated in spaces enclosed by the opposite surfaces of each stacking portion of the at least one first and second electrode substrates and each insulating ring.

3 Claims, 11 Drawing Sheets

SUPERCAPACITOR AND METHOD FOR FORMING THE SAME

BACKGROUND OF THE DISCLOSURE

1. Field of the Disclosure

The invention relates to a supercapacitor and method for forming the same, and more particularly, to a supercapacitor arranged with electrode substrates having a polarity in series or parallel.

2. Brief Description of the Related Art

A battery is a power source transforming a state of energy directly into an electrical energy without any mechanically transforming. A supercapacitor is an electric device for storing electric charges. Generally, a battery has high capacity but low output power, while a supercapacitor has high output power.

A supercapacitor is an energy storage with high power, high capacity and small scale. In the beginning, supercapacitors were employed in satellites by National Aeronautics and Space Administration (NASA). Afterwards, supercapacitors are widely used in wireless mobile phones, electric automobiles or motorcycles, portable electric tools, uninterruptible power supply (UPS) systems and 3C electronic products.

A supercapacitor of prior art is formed by vertically stacking multiple electrode substrates. The more the number of the stacked electrode substrates of the supercapacitor, the higher an output voltage of the supercapacitor. Also, the supercapacitor has an increased height and equivalent series resistance. With developments and changes of electronic products, reduced scale is a trend for them. The supercapacitor having an excessive height affects minimization of products. If the supercapacitor has an increased equivalent series resistance, the supercapacitor has a reduced output current.

SUMMARY OF THE DISCLOSURE

The present invention is directed to a supercapacitor and method for forming the same. Electrode substrates in a horizontally arrangement compose the supercapacitor having polarity in series, and thus the supercapacitor has a reduced height. Minimization of products can be achieved. Electrode substrates in a vertical arrangement compose the supercapacitor having a polarity in parallel such that the supercapacitor has a reduced equivalent series resistance and an increased output current.

In a first aspect, the present invention proposes a supercapacitor including a first electrode substrate having a surface coated with an active material, a second electrode substrate having a surface coated with the active material, wherein the first electrode substrate has a polarity reverse to that of the second electrode substrate, and a series connection electrode substrate having a surface coated with the active material, wherein the first and second electrode substrates are stacked with the series connection electrode substrate. The first and second electrode substrates and the series connection electrode substrate include stacking portions each having opposite surfaces arranged with a frame-shaped insulating ring. An electrolyte is accommodated in spaces enclosed by the opposite surfaces of each stacking portion of the first and second electrode substrates and the series connection electrode substrate and each insulating ring.

In a second aspect, following the first aspect, the present invention proposes the supercapacitor, wherein at least one middle electrode substrate is stacked between the first electrode substrate and the series connection electrode substrate and between the second electrode substrate and the series connection electrode substrate and has top and bottom surfaces coated with the active material. The first and second electrode substrates, the at least one middle electrode substrate and the series connection electrode substrate include stacking portions each having opposite surfaces arranged with the frame-shaped insulating ring. The electrolyte is accommodated in spaces enclosed by the opposite surfaces of each stacking portion of the first and second electrode substrates, the at least one middle electrode substrate and the series connection electrode substrate and each insulating ring.

In a third aspect, the present invention proposes a supercapacitor including a first electrode substrate having a surface coated with an active material, a second electrode substrate having a surface coated with the active material, wherein the first electrode substrate has a polarity reverse to that of the second electrode substrate, and multiple series connection electrode substrates each having a surface coated with the active material, wherein the first and second electrode substrates are stacked with partial regions of two of the series connection electrode substrates. Two of the series connection electrode substrates have partial regions stacked with each other and extend in longitudinal directions vertical to each other and/or extend in the same longitudinal directions. The first and second electrode substrates and the series connection electrode substrates include stacking portions each having opposite surfaces arranged with a frame-shaped insulating ring. An electrolyte is accommodated in spaces enclosed by the opposite surfaces of each stacking portion of the first and second electrode substrates and the series connection electrode substrates and each insulating ring.

In a fourth aspect, following the third aspect, the present invention proposes the supercapacitor, wherein at least one middle electrode substrate is stacked between the first electrode substrate and one of the series connection electrode substrates, between the second electrode substrate and one of the series connection electrode substrates and between the series connection electrode substrates stacked with each other, and has top and bottom surfaces coated with the active material. The first and second electrode substrates, the at least one middle electrode substrate and the series connection electrode substrates include stacking portions each having opposite surfaces arranged with the frame-shaped insulating ring. The electrolyte is accommodated in spaces enclosed by the opposite surfaces of each stacking portion of the first and second electrode substrates, the at least one middle electrode substrate and the series connection electrode substrates and each insulating ring.

In a fifth aspect, the present invention proposes a supercapacitor including at least three electrode substrates each having a surface coated with an active material. The at least three electrode substrates are stacked and connected in series. The at least three electrode substrates include stacking portions each having opposite surfaces arranged with a frame-shaped insulating ring. An electrolyte is accommodated in spaces enclosed by the opposite surfaces of each stacking portion of the at least three electrode substrates and each insulating ring.

In a sixth aspect, following the fifth aspect, the present invention proposes the supercapacitor, wherein at least one middle electrode substrate is stacked between neighboring ones of the at least three electrode substrates and has top and bottom surfaces coated with the active material. The at least three electrode substrates and the at least one middle electrode substrate include stacking portions each having opposite surfaces arranged with the frame-shaped insulating ring. The electrolyte is accommodated in spaces enclosed by the opposite surfaces of each stacking portion of the at least three electrode substrates and the at least one middle electrode substrate and each insulating ring.

In a seventh aspect, the present invention proposes a supercapacitor including at least one first electrode substrate having a surface coated with an active material, and at least one second electrode substrate having a surface coated with the active material, wherein the at least one first electrode substrate has a polarity reverse to that of the at least one second electrode substrate. The at least one first and second electrode substrates are stacked in an alternating arrangement. A plurality of the first electrode substrate having the same polarity or a plurality of the second electrode substrate having the same polarity is connected in parallel. The at least one first and second electrode substrates include stacking portions each having opposite surfaces arranged with a frame-shaped insulating ring. An electrolyte is accommodated in spaces enclosed by the opposite surfaces of each stacking portion of the at least one first and second electrode substrates and each insulating ring.

In an eighth aspect, following the seventh aspect, the present invention proposes the supercapacitor, wherein at least one middle electrode substrate is stacked between the at least one first and second electrode substrates and has top and bottom surfaces coated with the active material. The at least one first and second electrode substrates and the at least one middle electrode substrate include stacking portions each having opposite surfaces arranged with the frame-shaped insulating ring. The electrolyte is accommodated in spaces enclosed by the opposite surfaces of each stacking portion of the at least one first and second electrode substrates and the at least one middle electrode substrate and each insulating ring.

The present invention proposes a method for forming a supercapacitor including the following steps of printing an insulating ring and one or more supports on each surface of multiple electrode substrates using a screen having a pattern of the insulating ring and the supports, stacking the electrode substrate into one of the supercapacitors as above mentioned in the first through eight aspects, immersing the stacked supercapacitor into an electrolyte such that the electrolyte is accommodated into the supercapacitor, expelling a trace of air remaining in the supercapacitor immersed in the electrolyte, and laminating the supercapacitor.

The accompanying drawings are included to provide a further understanding of the invention, and are incorporated as a part of this specification. The drawings illustrate embodiments of the invention and, together with the description, serve to explain the principles of the invention.

DETAILED DESCRIPTION OF THE INVENTION

Figure 1A:
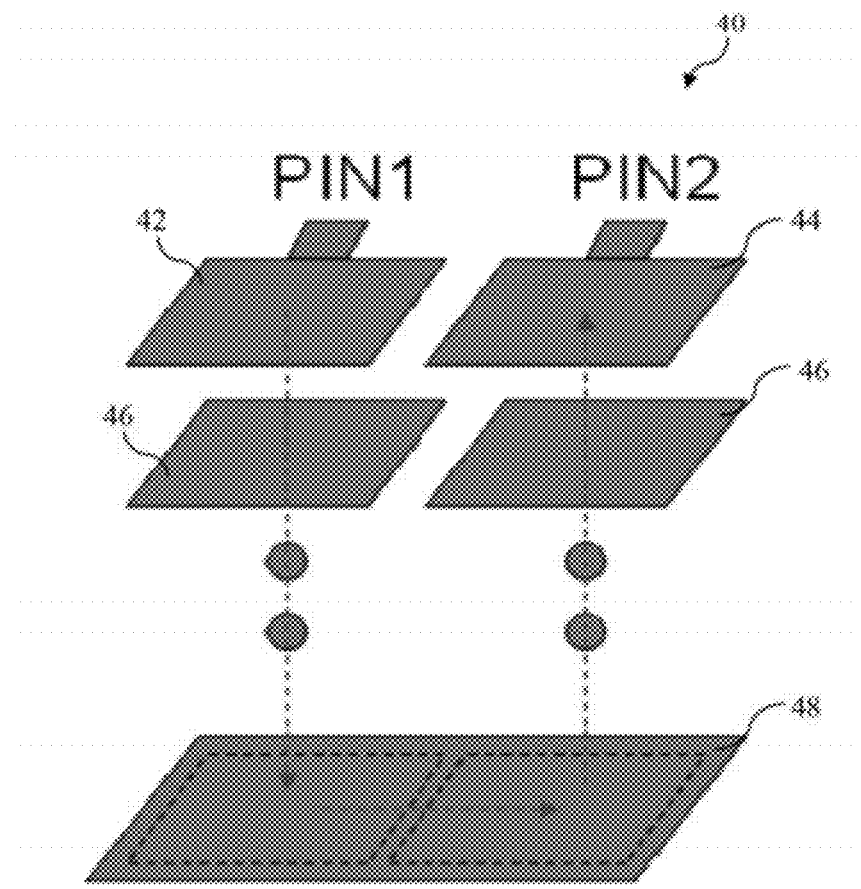
FIG. 1A is a schematic view showing arrangement of a supercapacitor in accordance of a first embodiment of the invention.

Illustrative embodiments accompanying with figures are now described below to lead the characteristics, contents, advantages and effects of the invention to be understood by the Examiner. Figures are illustrated only for explanation, but are not drawn to scale and precise arrangement, and thus the scope of the invention should not be limited by the scale and arrangement illustrated in the figures.

Following illustration accompanying with figures is embodiments for describing the present invention. In the following embodiments, same elements are indicated by same reference numerals.

Figure 1B:
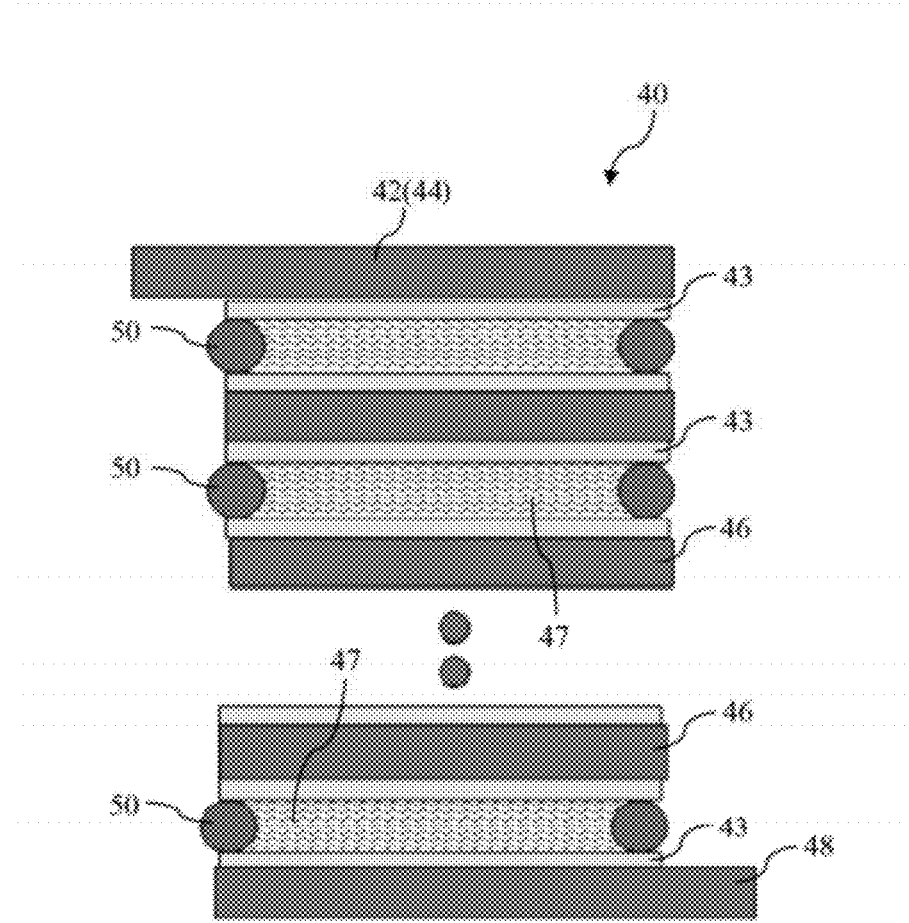
FIG. 1B is a schematically cross-sectional partial view of a supercapacitor in accordance of a first embodiment of the invention.

FIG. 1A is a schematic view showing arrangement of a supercapacitor in accordance of a first embodiment of the invention. FIG. 1B is a schematically cross-sectional partial view of the supercapacitor in accordance of the first embodiment of the invention. Referring to FIGS. 1A and 1B, a supercapacitor 40 contains a first electrode substrate 42, a second electrode substrate 44, a middle electrode substrates 46 and a series connection electrode substrate 48.

In the first embodiment, the first and second electrode substrates 42 and 44 each have a bottom surface coated with an active material 43. The first electrode substrate 42 has a polarity reverse to that of the second electrode substrate 44.

The active material 43 can be a metal oxide or active carbon, wherein the metal oxide can be ruthenium dioxide, manganese dioxide or titanium oxynitride (TiNO). The above-mentioned materials of the active material can be applied to that mentioned in following embodiments.

The series connection electrode substrate 48 has a top surface coated with the active material 43. The first and second electrode substrates 42 and 44 in a horizontal arrangement are stacked over the series connection electrode substrate 48. The top surface of the series connection electrode substrate 48 has an area substantially equal to the sum of areas of bottom surfaces of the first and second electrode substrates 42 and 44.

N middle electrode substrates 46 are stacked between the first electrode substrate 42 and the series connection electrode substrate 48, and N middle electrode substrates 46, wherein N=0, 1, 2, 3 or more, are stacked between the second electrode substrate 44 and the series connection electrode substrate 48. The number of the middle electrode substrates 46 stacked between the first electrode substrate 42 and the series connection electrode substrate 48 is equal to that of the middle electrode substrates 46 stacked between the second electrode substrate 44 and the series connection electrode substrate 48. Each middle electrode substrate 46 may have a surface area equal to a surface area of the first electrode substrate 42, a surface area of the second electrode substrate 44 and a half of a surface area of the series connection electrode substrate 48, respectively.

The middle electrode substrates 46 have top and bottom surfaces coated with the active material 43. The supercapacitor 40 has a working voltage depending on the number of the middle electrode substrates 46 between the first electrode substrate 42 and the series connection electrode substrate 48 and between the second electrode substrate 44 and the series connection electrode substrate 48.

The first and second electrode substrates 42 and 44, the middle electrode substrates 46 and the series connection electrode substrate 48 can be conductive substrates composed of titanium-based materials.

In the first embodiment, a bottom surface of the first electrode substrate 42 and a top surface of the middle electrode substrate 46 are arranged with a frame-shaped insulating ring 50. A bottom surface of the second electrode substrate 44 and a top surface of the middle electrode substrate 46 are arranged with a frame-shaped insulating ring 50. Two of the middle electrode substrates 46 include a stacking portion having opposite surfaces arranged with a frame-shaped insulating ring 50.

A top surface of the series connection electrode substrate 48 and bottom surfaces of the middle electrode substrates 46 are arranged with a frame-shaped insulating ring 50. If none of the middle electrode substrates 46 are set between the first electrode substrate 42 and the series connection electrode substrate 48 and between the second electrode substrate 44 and the series connection electrode substrate 48, a bottom surface of the first electrode substrate 42 and a top surface of the series connection electrode substrate 48 are arranged with a frame-shaped insulating ring 50, and a bottom surface of the second electrode substrate 44 and a top surface of the series connection electrode substrate 48 are arranged with a frame-shaped insulating ring 50.

The insulating ring 50 can be a frame-shaped glue printed using a screen (not shown). The frame-shaped glue has a height between 10 and 100 micrometers and a trace width between 0.3 and 5.0 micrometers, and preferably between 0.5 and 2.0 micrometers.

The insulating ring 50 can be a pressure-sensitive glue containing a base, a thickener and a solvent. The base can be an elastomer of a polystyrene copolymer that can be styrene butadiene styrene (SBS), styrene isoprene styrene (SIS), styrene ethylene butene styrene (SEBS) or styrene ethylene propylene styrene (SEPS). The base may contain maleic anhydride for increasing the bonding between the insulating rings 50 and the electrode substrates 42, 44, 46 and 48. The thickener can be abietic resins and their derivatives, aliphatic resins, alicyclic resins, aromatic resins, aliphatic resins/aromatic resins or hydrogenated hydrocarbon resins.

The above-mentioned materials and specifications of the insulating rings can be applied to those mentioned in following embodiments.

In the first embodiment, an electrolyte 47 is accommodated in a space enclosed by a bottom surface of the first electrode substrate 42, a top surface of the middle electrode substrate 46 and the insulating ring 50. An electrolyte 47 is accommodated in a space enclosed by a bottom surface of the second electrode substrate 44, the middle electrode substrate 46 and a top surface of the insulating ring 50. An electrolyte 47 is accommodated in a space enclosed by opposite surfaces of a stacking portion of two of the middle electrode substrates 46 and the insulating ring 50. An electrolyte 47 is accommodated in a space enclosed by a top surface of the series connection electrode substrate 48, bottom surfaces of the middle electrode substrates 46 and the insulating ring 50. If none of the middle electrode substrates 46 are set between the first electrode substrate 42 and the series connection electrode substrate 48 and between the second electrode substrate 44 and the series connection electrode substrate 48, an electrolyte 47 is accommodated in spaces enclosed by a top surface of the series connection electrode substrate 48, a bottom surface of the first electrode substrate 42 and the insulating ring 50 and enclosed by a top surface of the series connection electrode substrate 48, a bottom surface of the second electrode substrate 44 and the insulating ring 50.

The electrolyte 47 can be one of a water soluble electrolyte, an organic electrolyte and a colloidal electrolyte. The water soluble electrolyte can be a sulfuric acid aqueous solution having a concentration between 0.5M and 5.0M, and preferably between 1.0M and 5.0M. The colloidal electrolyte can be composed of water glass and sulfuric acid. The above-mentioned materials of the electrolyte can be applied to that mentioned in following embodiments.

The first and second electrode substrates 42 and 44, the middle electrode substrates 46 and a series connection electrode substrate 48 include stacking portions each having opposite surfaces printed with a pattern of one or more supports (not shown) using a screen. The supports can be shaped of pillars, square columns, triangle columns, polygon columns, cross columns, mounds or hemispheres. The supports may have a diameter between 0.4 and 4.0 mm, and preferably between 0.5 and 2.0 mm. The supports may have a density between 0.5 and 5 points per square centimeter, and preferably between 1 and 5 points per square centimeter. The supports may have a height between 10 and 100 micrometers. The above-mentioned materials and specifications of the supports can be applied to those mentioned in following embodiments.

After assembling the supercapacitor 40 in accordance with the first embodiment, the supercapacitor 40 can achieve working voltages and characteristics of conventional supercapacitors, but only has a half height of the conventional supercapacitors. However, with regards to a power instrument containing electronic devices required to have high voltages and ultrathin thicknesses, the supercapacitor 40 in accordance with the first embodiment has the height that cannot meet the requirement. Accordingly, another supercapacitor is proposed to meet the requirement of the high voltage and the ultrathin thickness for the power instrument.

Figure 2:
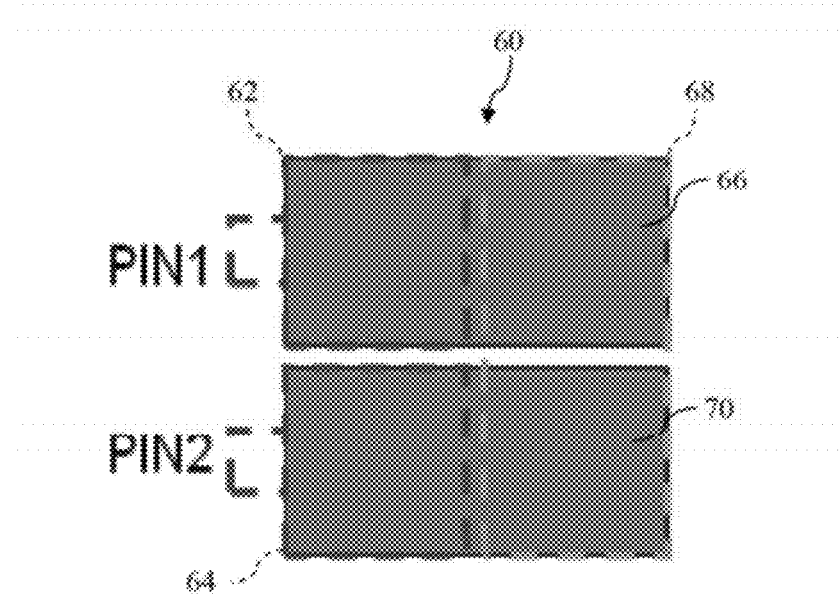
FIG. 2 is a schematic view showing arrangement of a supercapacitor in accordance of a second embodiment of the invention.

FIG. 2 is a schematic view showing arrangement of a supercapacitor in accordance of a second embodiment of the invention. Referring to FIG. 2, a supercapacitor 60 contains a first electrode substrate 62, a second electrode substrate 64 and multiple series connection electrode substrates 66, 68 and 70.

In the second embodiment, the first and second electrode substrates 62 and 64 and series connection electrode substrates 66, 68 and 70 have stacking portions each having opposite surfaces coated with the active material as shown in FIG. 1B. The first electrode substrate 62 has a polarity reverse to that of the second electrode substrate 64.

The series connection electrode substrate 66 has a half of a bottom surface stacked with the first electrode substrate 62 and the other half of the bottom surface stacked with a half of a top surface of the series connection electrode substrate 68. The series connection electrode substrates 66 and 68 stacked with each other extend in longitudinal directions vertical to each other. The series connection electrode substrate 70 has a half of a bottom surface stacked with the other half of the top surface of the series connection electrode substrate 68 and the other half of the bottom surface stacked with the second electrode substrate 64. The series connection electrode substrates 68 and 70 stacked with each other extend in longitudinal directions vertical to each other.

The supercapacitor 60 in accordance with the second embodiment has a plane of a square such that the planar supercapacitor 60 can meet the requirement of the high voltage and the ultrathin thickness for the power instrument. Alternatively, the supercapacitor 60 may have a plane of any geometry shape, not limited to a square. A supercapacitor, in accordance with the second embodiment, has a working voltage and thickness depending on the number of the series connection electrode substrates.

As mentioned in the first embodiment, the N middle electrode substrates, wherein N=1, 2, 3 or more, as shown in FIG. 1B can be applied to the second embodiment and can be stacked between the first electrode substrate 62 and the series connection electrode substrate 66, between the second electrode substrate 64 and the series connection electrode substrate 70, and between stacking portions of the series connection electrode substrates 66, 68 and 70. The number of middle electrode substrates stacked between the first electrode substrate 62 and the series connection electrode substrate 66 may be the same as the number of those stacked between the second electrode substrate 64 and the series connection electrode substrate 70 and as the number of those stacked between each stacking portion of the series connection electrode substrates 66, 68 and 70. Each middle electrode substrate may have a surface area equal to a surface area of the first electrode substrate 62, a surface area of the second electrode substrate 64 and halves of surface areas of the series connection electrode substrates 66, 68 and 70, respectively.

As mentioned in the first embodiment, the middle electrode substrates applied to the second embodiment have top and bottom surfaces coated with the active material. The supercapacitor 60 has a working voltage depending on the number of the middle electrode substrates stacked between the first electrode substrate 62 and the series connection electrode substrate 66, between the second electrode substrate 64 and the series connection electrode substrate 70 and between each stacking portion of the series connection electrode substrates 66, 68 and 70.

As mentioned in the first embodiment, the frame-shaped insulating rings can be applied to the second embodiment. The first electrode substrate 62 and the middle electrode substrates have a stacking portion with opposite surfaces arranged with the frame-shaped insulating ring; the second electrode substrate 64 and the middle electrode substrates have a stacking portion with opposite surfaces arranged with the frame-shaped insulating ring; two of the middle electrode substrates include stacking portions each having opposite surfaces arranged with the frame-shaped insulating ring; the series connection electrode substrates 66, 68 and 70 and the middle electrode substrates include stacking portions each having opposite surfaces arranged with the frame-shaped insulating ring. If none of the middle electrode substrates are set between the first electrode substrate 62 and the series connection electrode substrate 66, between the series connection electrode substrates 66 and 68, between the series connection electrode substrates 68 and 70, and between the series connection electrode substrate 70 and the second electrode substrate 64, the first electrode substrate 62 and the series connection electrode substrate 66 have a stacking portion with opposite surfaces arranged with the frame-shaped insulating ring, the series connection electrode substrates 66 and 68 have a stacking portion with opposite surfaces arranged with the frame-shaped insulating ring, the series connection electrode substrates 68 and 70 have a stacking portion with opposite surfaces arranged with the frame-shaped insulating ring, and the series connection electrode substrate 70 and the second electrode substrate 64 have a stacking portion with opposite surfaces arranged with the frame-shaped insulating ring.

As mentioned in the first embodiment, the electrolyte as shown in FIG. 1B can be applied to the second embodiment. The electrolyte can be accommodated in spaces enclosed by opposite surfaces of a stacking portion of the first electrode substrate 62 and the middle electrode substrates and the insulating ring, enclosed by opposite surfaces of a stacking portion of the second electrode substrate 64 and the middle electrode substrates and the insulating ring, enclosed by opposite surfaces of each stacking portion of two of the middle electrode substrates and the insulating ring, and enclosed by opposite surfaces of each stacking portion of the series connection electrode substrates 66, 68 and 70 and the middle electrode substrates and the insulating ring. If none of the middle electrode substrates are set between the first and second electrode substrates 62 and 64 and the series connection electrode substrates 66, 68 and 70, the electrolyte can be accommodated in spaces enclosed by opposite surfaces of each stacking portion of the first and second electrode substrates 62 and 64 and the series connection electrode substrates 66, 68 and 70.

The supercapacitor containing the middle electrode substrates, in accordance with the second embodiment, may be shaped like a square cube. Alternatively, the supercapacitor may have any geometry shape, not limited to a square cube. A supercapacitor, in accordance with the second embodiment, has a working voltage and thickness depending on the number of the series connection electrode substrates and the middle electrode substrates.

Figure 3A:
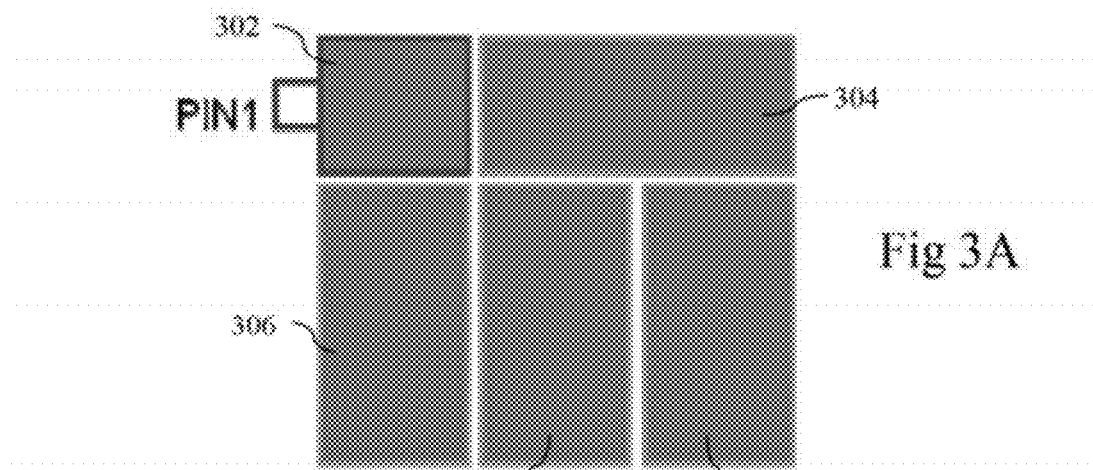
FIG. 3A is a schematic view showing arrangement of a first layer of electrode substrates of a supercapacitor in accordance of a third embodiment of the invention.
Figure 3B:
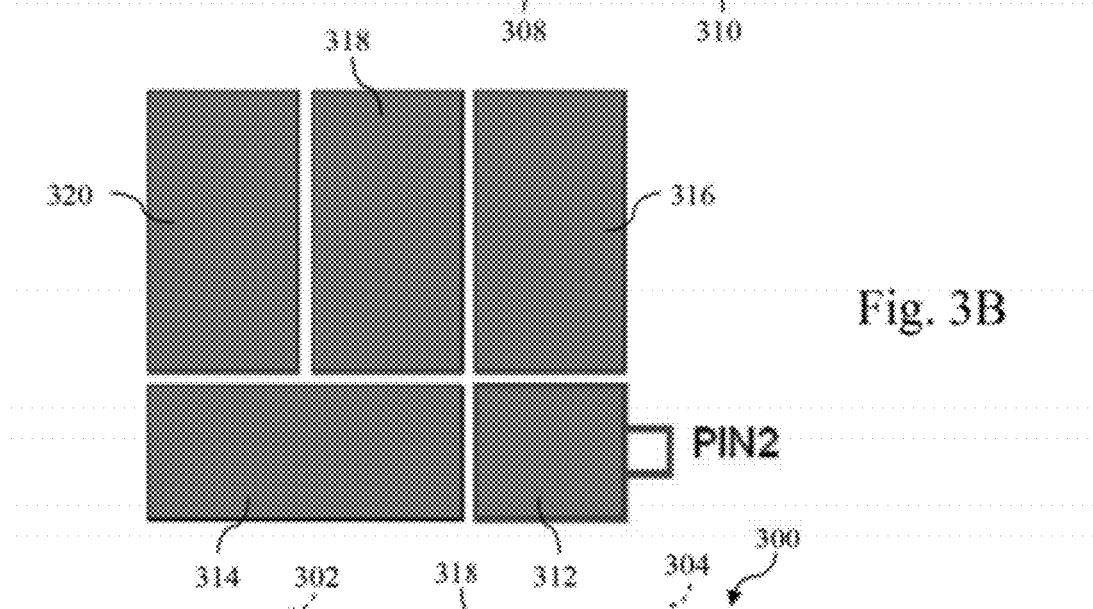
FIG. 3B is a schematic view showing arrangement of a second layer of electrode substrates of a supercapacitor in accordance of a third embodiment of the invention.
Figure 3C:
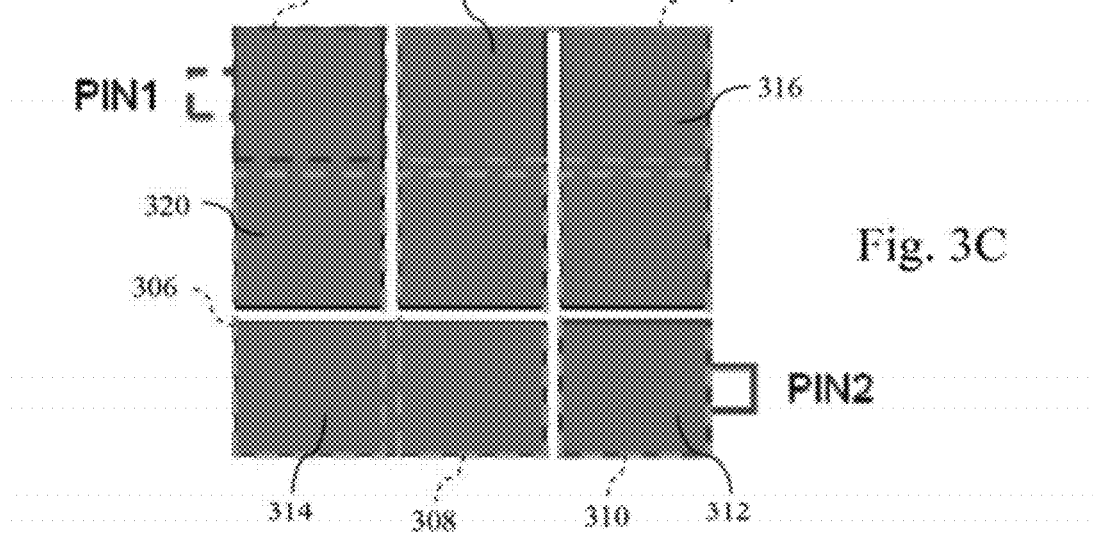
FIG. 3C is a schematic view showing arrangement of a supercapacitor in accordance of a third embodiment of the invention.

FIG. 3A is a schematic view showing arrangement of a first layer of electrode substrates of a supercapacitor in accordance of a third embodiment of the invention. FIG. 3B is a schematic view showing arrangement of a second layer of electrode substrates of a supercapacitor in accordance of a third embodiment of the invention. FIG. 3C is a schematic view showing arrangement of a supercapacitor in accordance of a third embodiment of the invention.

Referring to FIG. 3A, a first electrode substrate 302 and a series connection electrode substrate 304 are in a horizontal arrangement. Series connection electrode substrate 306, 308 and 310 in a horizontal arrangement are vertical to the first electrode substrate 302 and the series connection electrode substrate 304. The first electrode substrate 302 and the series connection electrode substrates 304, 306, 308 and 310 compose a first layer of a supercapacitor 300.

Referring to FIG. 3B, a second electrode substrate 312 and a series connection electrode substrate 314 are in a horizontal arrangement. Series connection electrode substrate 316, 318 and 320 in a horizontal arrangement are vertical to the second electrode substrate 312 and the series connection electrode substrate 314. The second electrode substrate 312 and the series connection electrode substrates 314, 316, 318 and 320 compose a second layer of the supercapacitor 300.

Referring to FIG. 3C, the second layer of the supercapacitor 300 is stacked over the first layer of the supercapacitor 300. The series connection electrode substrate 320 has a half of a bottom surface stacked with the first electrode substrate 302 and the other half of the bottom surface stacked with a half of a top surface of the series connection electrode substrate 306. The series connection electrode substrates 320 and 306 stacked with each other and extend in the same longitudinal direction.

The series connection electrode substrate 314 has a bottom surface stacked with the other half of the top surface of the series connection electrode substrate 306 and a half of a top surface of the series connection electrode substrate 308. The series connection electrode substrates 314 and 306 stacked with each other extend in longitudinal directions vertical to each other. The series connection electrode substrates 314 and 308 stacked with each other extend in longitudinal directions vertical to each other.

The series connection electrode substrate 318 has a bottom surface stacked with the other half of the top surface of the series connection electrode substrate 308 and a half of a top surface of the series connection electrode substrate 304. The series connection electrode substrates 318 and 308 stacked with each other extend in the same longitudinal direction. The series connection electrode substrates 318 and 304 stacked with each other extend in longitudinal directions vertical to each other.

The series connection electrode substrate 316 has a bottom surface stacked with the other half of the top surface of the series connection electrode substrate 304 and a half of a top surface of the series connection electrode substrate 310. The series connection electrode substrates 316 and 304 stacked with each other extend in longitudinal directions vertical to each other. The series connection electrode substrates 316 and 310 stacked with each other and extend in the same longitudinal direction. The second electrode substrate 312 has a bottom surface stacked with the other half of the top surface of the series connection electrode substrate 310.

The supercapacitor 300 in accordance with the third embodiment has a plane of a square such that the planar supercapacitor 300 can meet the requirement of the high voltage and the ultrathin thickness for the power instrument. Alternatively, the supercapacitor 60 may have a plane of any geometry shape, not limited to a square. A supercapacitor, in accordance with the third embodiment, has a working voltage and thickness depending on the number of the series connection electrode substrates.

As mentioned in the first embodiment, the N middle electrode substrates, wherein N=1, 2, 3 or more, as shown in FIG. 1B can be applied to the third embodiment and can be stacked between the first electrode substrate 302 and the series connection electrode substrate 320, between the second electrode substrate 312 and the series connection electrode substrate 310, and between stacking portions of the series connection electrode substrates 304, 306, 308, 310, 314, 316, 318 and 320. The number of the middle electrode substrates stacked between the first electrode substrate 302 and the series connection electrode substrate 320 may be the same as the number of those stacked between the second electrode substrate 312 and the series connection electrode substrate 310 and as the number of those stacked between each stacking portion of the series connection electrode substrates 304, 306, 308, 310, 314, 316, 318 and 320. Each middle electrode substrate may have a surface area equal to a surface area of the first electrode substrate 302, a surface area of the second electrode substrate 312 and halves of surface areas of the series connection electrode substrates 304, 306, 308, 310, 314, 316, 318 and 320, respectively.

As mentioned in the first embodiment, the middle electrode substrates applied to the third embodiment have top and bottom surfaces coated with the active material. The supercapacitor 300 has a working voltage depending on the number of the middle electrode substrates stacked between the first and second electrode substrates 302 and 312 and the series connection electrode substrates 304, 306, 308, 310, 314, 316, 318 and 320.

As mentioned in the first embodiment, the frame-shaped insulating rings can be applied to the third embodiment. The first electrode substrate 302 and the middle electrode substrates have a stacking portion with opposite surfaces arranged with the frame-shaped insulating ring; the second electrode substrate 312 and the middle electrode substrates have a stacking portion with opposite surfaces arranged with the frame-shaped insulating ring; two of the middle electrode substrates include stacking portions each having opposite surfaces arranged with the frame-shaped insulating ring; the series connection electrode substrates 304, 306, 308, 310, 314, 316, 318 and 320 and the middle electrode substrates include stacking portions each having opposite surfaces arranged with the frame-shaped insulating ring. If none of the middle electrode substrates are set between the first electrode substrate 302 and the series connection electrode substrate 320, between the series connection electrode substrates 320 and 306, between the series connection electrode substrates 306 and 314, between the series connection electrode substrates 314 and 308, between the series connection electrode substrates 308 and 318, between the series connection electrode substrates 318 and 304, between the series connection electrode substrates 304 and 316, between the series connection electrode substrates 316 and 310, and between the series connection electrode substrate 310 and the second electrode substrate 312, the first electrode substrate 302 and the series connection electrode substrate 320 have a stacking portion with opposite surfaces arranged with the frame-shaped insulating ring, the series connection electrode substrates 320 and 306 have a stacking portion with opposite surfaces arranged with the frame-shaped insulating ring, the series connection electrode substrates 306 and 314 have a stacking portion with opposite surfaces arranged with the frame-shaped insulating ring, the series connection electrode substrates 314 and 308 have a stacking portion with opposite surfaces arranged with the frame-shaped insulating ring, the series connection electrode substrates 308 and 318 have a stacking portion with opposite surfaces arranged with the frame-shaped insulating ring, the series connection electrode substrates 318 and 304 have a stacking portion with opposite surfaces arranged with the frame-shaped insulating ring, the series connection electrode substrates 304 and 316 have a stacking portion with opposite surfaces arranged with the frame-shaped insulating ring, the series connection electrode substrates 316 and 310 have a stacking portion with opposite surfaces arranged with the frame-shaped insulating ring, and the series connection electrode substrate 310 and the second electrode substrate 312 have a stacking portion with opposite surfaces arranged with the frame-shaped insulating ring.

As mentioned in the first embodiment, the electrolyte as shown in FIG. 1B can be applied to the third embodiment. The electrolyte can be accommodated in spaces enclosed by opposite surfaces of a stacking portion of the first electrode substrate 302 and the middle electrode substrates and the insulating ring, enclosed by opposite surfaces of a stacking portion of the second electrode substrate 312 and the middle electrode substrates and the insulating ring, enclosed by opposite surfaces of each stacking portion of two of the middle electrode substrates and the insulating ring, and enclosed by opposite surfaces of each stacking portion of the series connection electrode substrates 304, 306, 308, 310, 314, 316, 318 and 320 and the middle electrode substrates and the insulating ring. If none of the middle electrode substrates are set between the first and second electrode substrates 302 and 312 and the series connection electrode substrates 304, 306, 308, 310, 314, 316, 318 and 320, the electrolyte can be accommodated in spaces enclosed by opposite surfaces of each stacking portion of the first and second electrode substrates 302 and 312 and the series connection electrode substrates 304, 306, 308, 310, 314, 316, 318 and 320.

The supercapacitor containing the middle electrode substrates, in accordance with the third embodiment, may be shaped like a square cube. Alternatively, the supercapacitor may have any geometry shape, not limited to a square cube. A supercapacitor, in accordance with the third embodiment, has a working voltage and thickness depending on the number of the series connection electrode substrates and the middle electrode substrates.

Figure 4A:
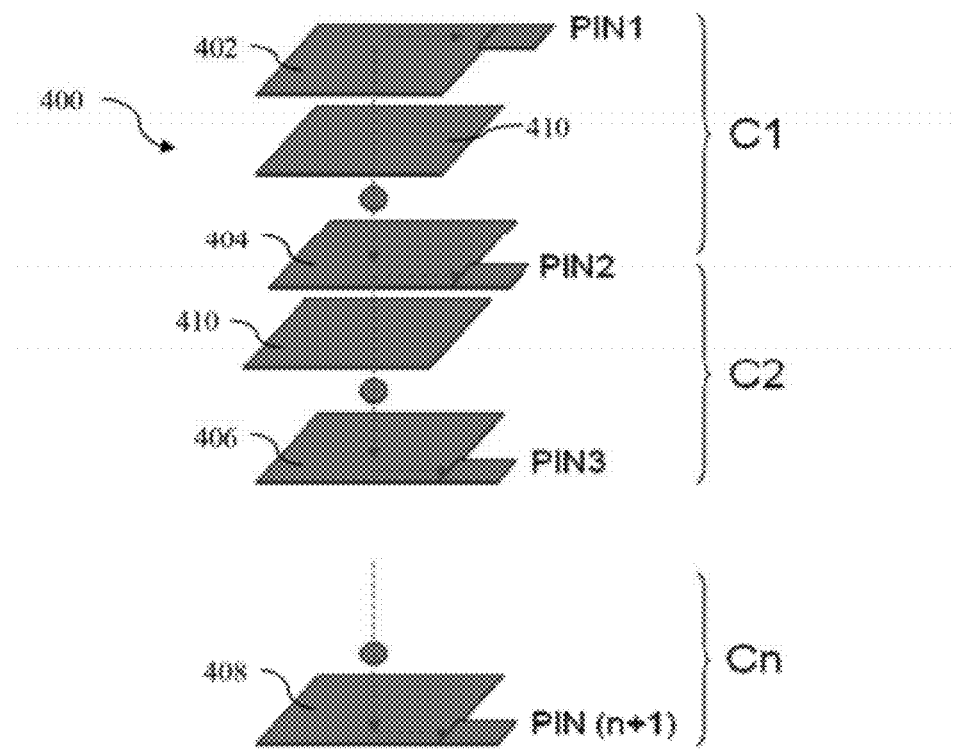
FIG. 4A is a schematic view showing arrangement of a supercapacitor in accordance of a fourth embodiment of the invention.

FIG. 4A is a schematic view showing arrangement of a supercapacitor in accordance of a fourth embodiment of the invention. A supercapacitor 400 contains n+1 electrode substrates 402, 404, 406 and 408, wherein n is equal to or greater than 2, and N middle electrode substrates 410, wherein N=1, 2, 3 or more.

The electrode substrates 402, 404, 406 and 408 and the middle electrode substrates 410 can be conductive substrates composed of titanium-based materials. Each middle electrode substrate 410 may have a surface area equal to surface areas of the electrode substrates 402, 404, 406 and 408, respectively.

As mentioned in the first embodiment, the electrode substrates 402, 404, 406 and 408 and middle electrode substrates 410, in accordance with the fourth embodiment, have stacking portions each having opposite surfaces coated with the active material as shown in FIG. 1B. The electrode substrate 402 and the middle electrode substrates 410 have a stacking portion with opposite surfaces arranged with the frame-shaped insulating ring as shown in FIG. 1B, the electrode substrate 404 and the middle electrode substrates 410 include stacking portions each having opposite surfaces arranged with the frame-shaped insulating ring, and so on. The $(n+1)^{th}$ electrode substrate 408 and the middle electrode substrates 410 have a stacking portion with opposite surfaces arranged with the frame-shaped insulating ring. Two of the middle electrode substrates 410 have a stacking portion with opposite surfaces arranged with the frame-shaped insulating ring.

As mentioned in the first embodiment, the electrolyte as shown in FIG. 1B can be applied to the fourth embodiment. The electrolyte can be accommodated in spaces enclosed by opposite surfaces of a stacking portion of the electrode substrate 402 and the middle electrode substrates 410 and the insulating ring, enclosed by opposite surfaces of each stacking portion of the electrode substrate 404 and the middle electrode substrates 410 and the insulating ring, and so on. The electrolyte can be accommodated in spaces enclosed by opposite surfaces of a stacking portion of the $(n+1)^{th}$ electrode substrate 408 and the middle electrode substrates 410 and the insulating ring, and enclosed by opposite surfaces of a stacking portion of two of the middle electrode substrates 410 and the insulating ring.

Figure 4B:
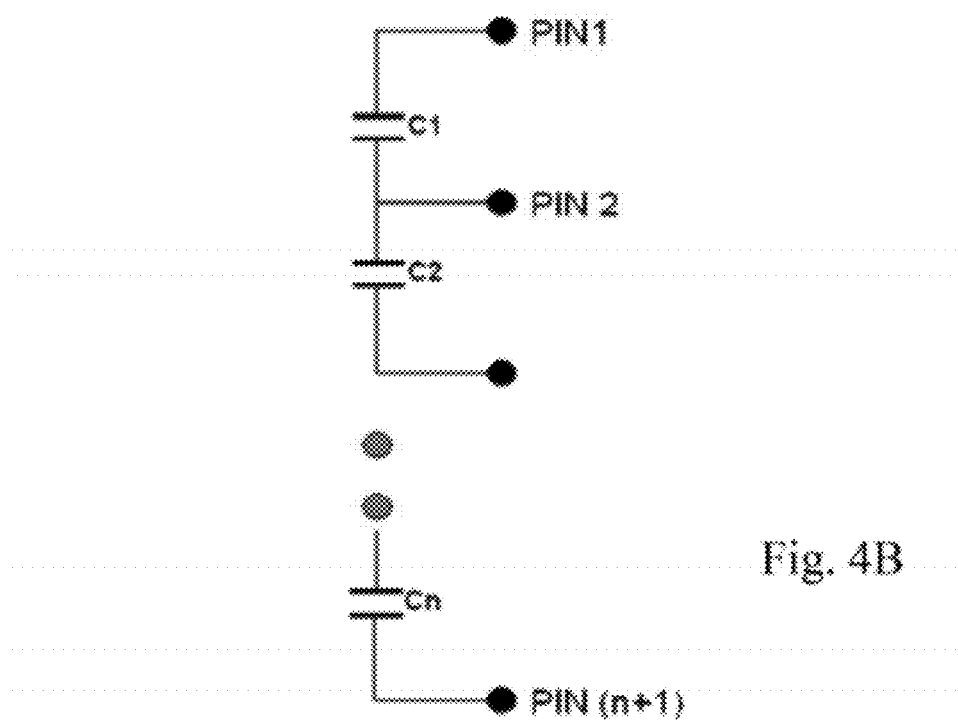
FIG. 4B is an equivalent circuit view of a supercapacitor in accordance of a fourth embodiment of the invention.

FIG. 4B is an equivalent circuit view of a supercapacitor in accordance of a fourth embodiment of the invention. Referring to FIGS. 4A and 4B, the electrode substrates 402 and 404 and the middle electrode substrates 410 compose a supercapacitor C1, the electrode substrates 404 and 406 and the middle electrode substrates 410 compose a supercapacitor C2 and so on. The $n^{th}$ electrode substrate (not shown) and the $(n+1)^{th}$ electrode substrate 408 and the middle electrode substrates (not shown) compose a supercapacitor Cn.

The numbers of the middle electrode substrates 410 between neighboring ones of the electrode substrates can be the same or different such that the supercapacitors C1, C2 . . . and Cn may have the same capacitance or various capacitances. The supercapacitor 400 has PIN1, PIN2 . . . and PIN(n+1) for providing multiple sets of power, a single set of power, series connection of power or parallel connection of power for an output loading.

Figure 5:
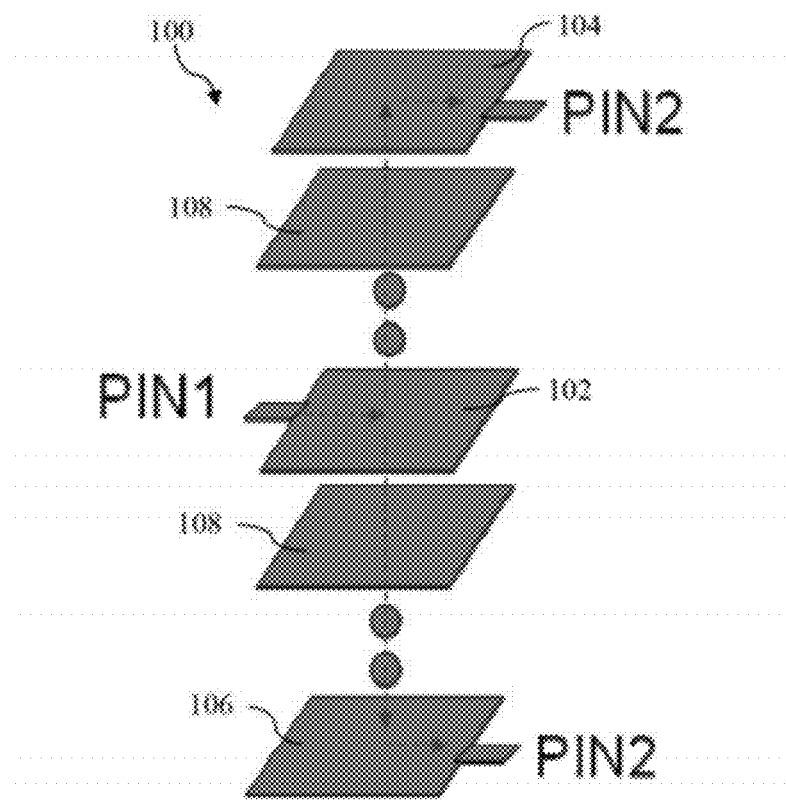
FIG. 5 is a schematic view showing arrangement of a supercapacitor in accordance of a fifth embodiment of the invention.

FIG. 5 is a schematic view showing arrangement of a supercapacitor in accordance of a fifth embodiment of the invention. Referring to FIG. 5, a supercapacitor 100 includes a first electrode substrate 102, two second electrode substrates 104 and 106 and N middle electrode substrates 108, wherein N=1, 2, 3 or more.

The first electrode substrate 102, the second electrode substrates 104 and 106 and the middle electrode substrates 108 can be conductive substrates composed of titanium-based materials.

As mentioned in the first embodiment, top and bottom surfaces of the first electrode substrate 102, a bottom surface of the second electrode substrate 104 and a top surface of the second electrode substrate 106, in accordance with the fifth embodiment, are coated with the active material. The second electrode substrates 104 and 106 have a polarity reverse to that of the first electrode substrate 102. The first electrode substrate 102 and the second electrode substrates 104 and 106 are stacked in an alternating arrangement, that is, the first electrode substrate 102 are stacked between the second electrode substrates 104 and 106. The second electrode substrates 104 and 106 having the same polarity are connected in parallel.

The N middle electrode substrates 108 can be stacked between the first and second electrode substrates 102 and 104 and between the first and second electrode substrates 102 and 106. The number of the middle electrode substrates 108 stacked between the first and second electrode substrates 102 and 104 may be the same as the number of those stacked between the first and second electrode substrates 102 and 106. Each middle electrode substrate 108 may have a surface area equal to a surface area of the first electrode substrate 102 and surface areas of the second electrode substrates 104 and 106, respectively.

As mentioned in the first embodiment, the middle electrode substrates 108 in accordance with the fifth embodiment have top and bottom surfaces coated with the active material as shown in FIG. 1B. The supercapacitor 100 has a working voltage depending on the number of the middle electrode substrates 108 stacked between the first electrode substrate 102 and the second electrode substrates 104 and 106 stacked in an alternating arrangement.

As mentioned in the first embodiment, the frame-shaped insulating rings as shown in FIG. 1B can be applied to the fifth embodiment. The first electrode substrate 102 and the middle electrode substrates 108 include stacking portions each having opposite surfaces arranged with the frame-shaped insulating ring; the second electrode substrate 104 and the middle electrode substrates 108 have a stacking portion with opposite surfaces arranged with the frame-shaped insulating ring; the second electrode substrate 106 and the middle electrode substrates 108 have a stacking portion with opposite surfaces arranged with the frame-shaped insulating ring; two of the middle electrode substrates 108 include stacking portions each having opposite surfaces arranged with the frame-shaped insulating ring.

As mentioned in the first embodiment, the electrolyte as shown in FIG. 1B can be applied to the fifth embodiment. The electrolyte can be accommodated in spaces enclosed by opposite surfaces of a stacking portion of the first electrode substrate 102 and the middle electrode substrates 108 and the insulating ring, enclosed by opposite surfaces of a stacking portion of the second electrode substrate 104 and the middle electrode substrates 108 and the insulating ring, enclosed by opposite surfaces of a stacking portion of the second electrode substrate 106 and the middle electrode substrates 108 and the insulating ring, and enclosed by opposite surfaces of each stacking portion of two of the middle electrode substrates 108 and the insulating ring.

In accordance with the fifth embodiment, the supercapacitor 100 containing the electrode substrates that have the same polarity and are connected in parallel can achieve working voltages and characteristics of conventional supercapacitors, but has the same height as the conventional supercapacitors. Accordingly, the supercapacitor 100 can be applied to a power instrument providing a higher working current to an electronic device.

Figure 6:
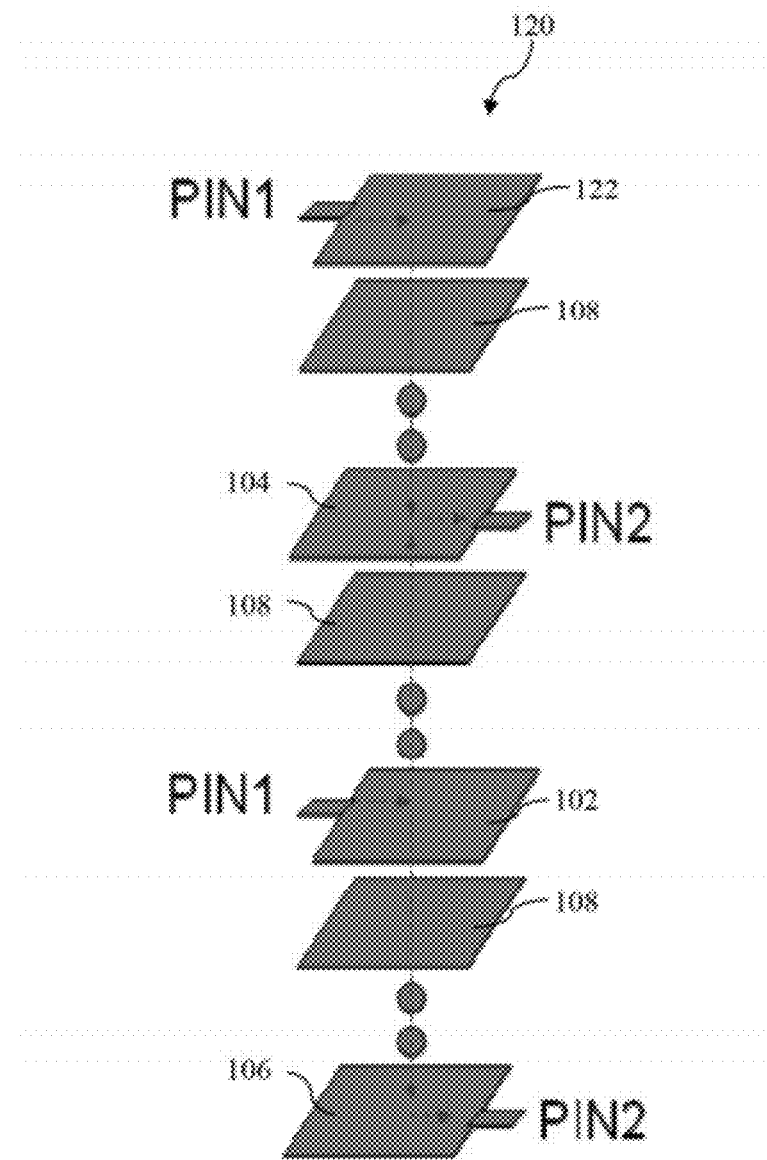
FIG. 6 is a schematic view showing arrangement of a supercapacitor in accordance of a sixth embodiment of the invention.

FIG. 6 is a schematic view showing arrangement of a supercapacitor in accordance of a sixth embodiment of the invention. Referring to FIG. 6, a supercapacitor 120 includes two first electrode substrates 102 and 122, two second electrode substrates 104 and 106 and N middle electrode substrates 108, wherein N=1, 2, 3 or more.

The difference between the supercapacitor 120 of the sixth embodiment and the supercapacitor 100 of the fifth embodiment is that the supercapacitor 120 contains additional first electrode substrate 122, the N middle electrode substrates 108 can be further stacked between the first and second electrode substrates 122 and 104, and the first electrode substrates 102 and 122 having the same polarity are connected in parallel. The arrangement of the supercapacitor 120 in accordance with the sixth embodiment can be referred to that of the supercapacitor 100 in accordance with the fifth embodiment, and the description thereof is omitted.

A method for forming supercapacitors in accordance with the first through sixth embodiments is introduced in the following paragraphs.

Figure 7:
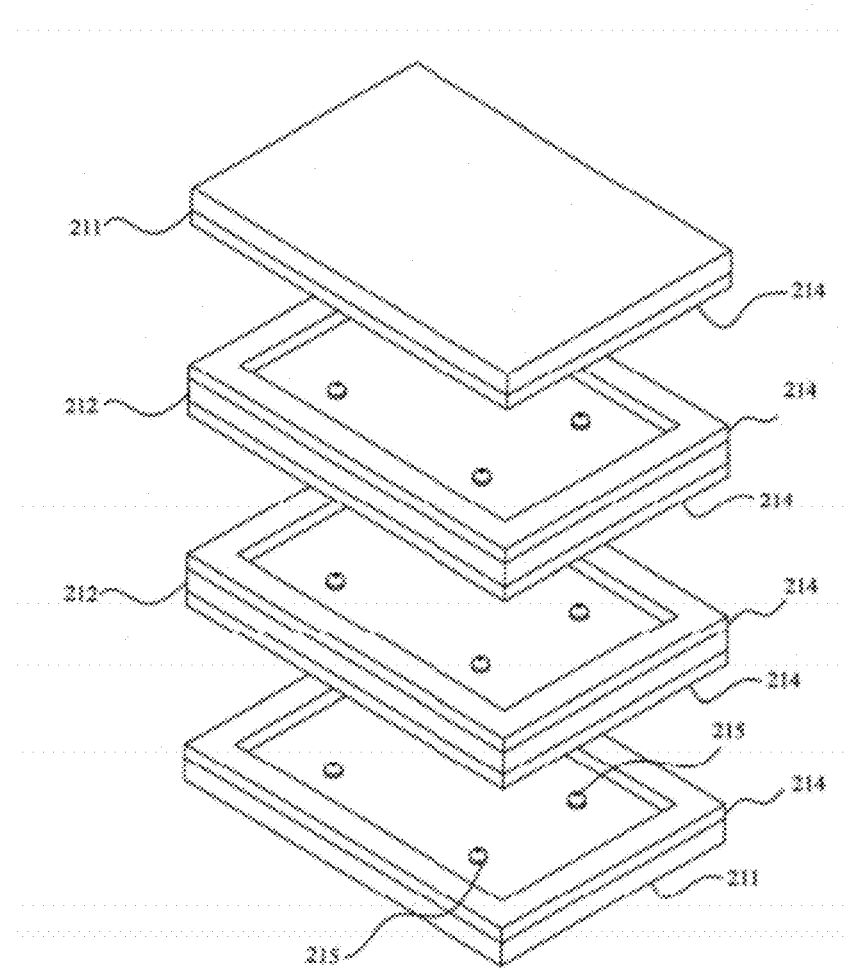
FIG. 7 is a schematic view showing arrangement of a supercapacitor of the invention.

FIG. 7 is a schematic view showing arrangement of a supercapacitor of the invention. Referring to FIG. 7, a pattern can be printed on surfaces of the electrode substrates, like those 211 and 212 shown in FIG. 7, of the supercapacitor in accordance with one of the first through sixth embodiments using a screen 200 shown in FIG. 8, a schematic view of a printing screen of the invention. Insulating rings 214 and supports 215 can be formed on the electrode substrates 211 and 212 using a screen printing process, a stencil printing process, a stamping process, a dispensing process, a coating process, a pasting process or a photolithography process.

Figure 8:
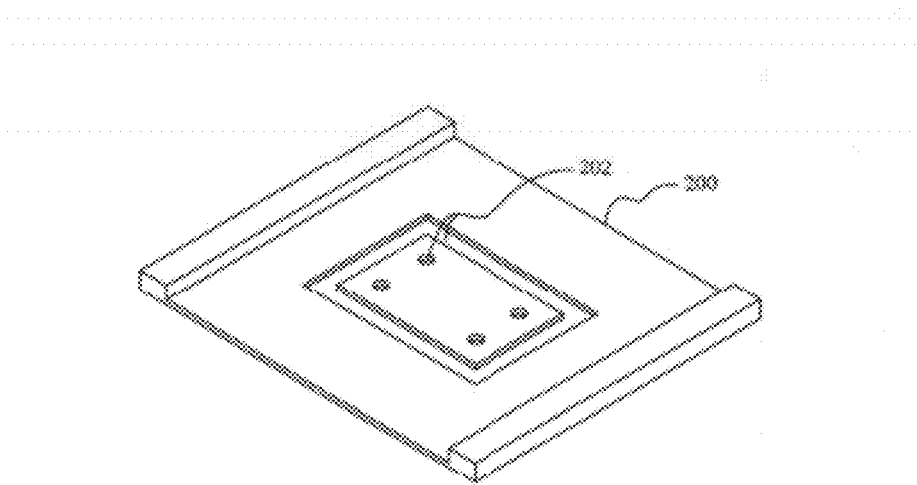
FIG. 8 is a schematic view of a printing screen of the invention.

Referring to FIG. 8, the insulating rings and supports of the supercapacitor in accordance with one of the first through sixth embodiments can be printed on surfaces of the electrode substrates using a screen 200 having a pattern 202 of an insulating ring and one or more supports.

First, a pressure-sensitive insulating glue is formed by pouring a specific amount of a base, that is, an elastomer of a polystyrene copolymer, a thickener and various solvents into an agitator and agitating them accompanied with heating and dissolving them until the glue becomes in a homogeneous phase.

Figure 9:
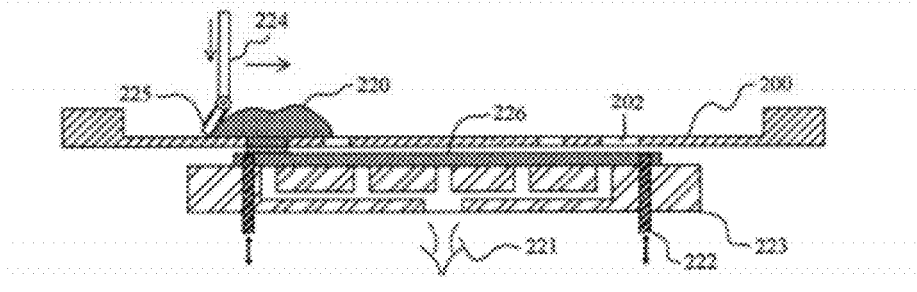
FIG. 9 is a side view showing a screen printing mechanism for printing patterns of an electrode substrate in accordance with the invention.

FIG. 9 is a side view showing a screen printing mechanism for printing a pattern of an electrode substrate in accordance with the invention. Referring to FIG. 9, the electrode substrates, like that 226 shown in FIG. 9, of the supercapacitor in accordance with one of the first through sixth embodiments can be put on an air suction jig 223 and can be fixed on the air suction jig 223 by sucking the electrode substrate 226 through an air suction port 221. Positioning pins 222 can be used to position the electrode substrate 226.

The screen 200 can be put on the electrode substrate 226 with a clearance between them. The above insulating glue 220 can be disposed on the screen 200. A scraping mechanism 224 can lead a scraping plate 225 to move on the screen 200 and to have the insulating glue 220 filled into the pattern 202 of the screen 200. The insulating glue 220 filled into the pattern 202 can be printed on a surface of the electrode substrate 226 such that the frame-shaped insulating rings and supports of the supercapacitor in accordance with one of the first through sixth embodiments can be formed, wherein the printed insulating rings and supports have the same height.

Next, the electrode substrates can be stacked into the supercapacitor in accordance with one of the first through sixth embodiments.

Figure 10:
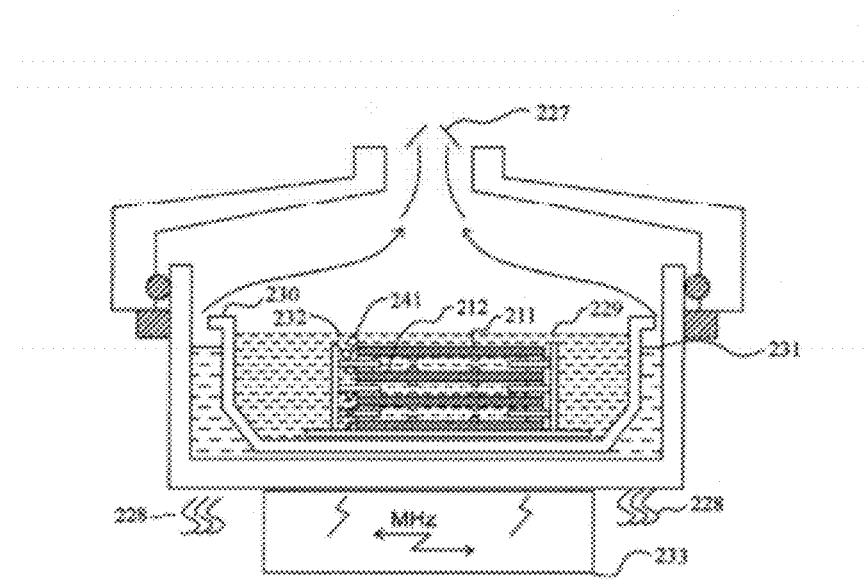
FIG. 10 is a side view of an ultrasonic, heating or vacuum pumping tank of the invention.
Figure 11:
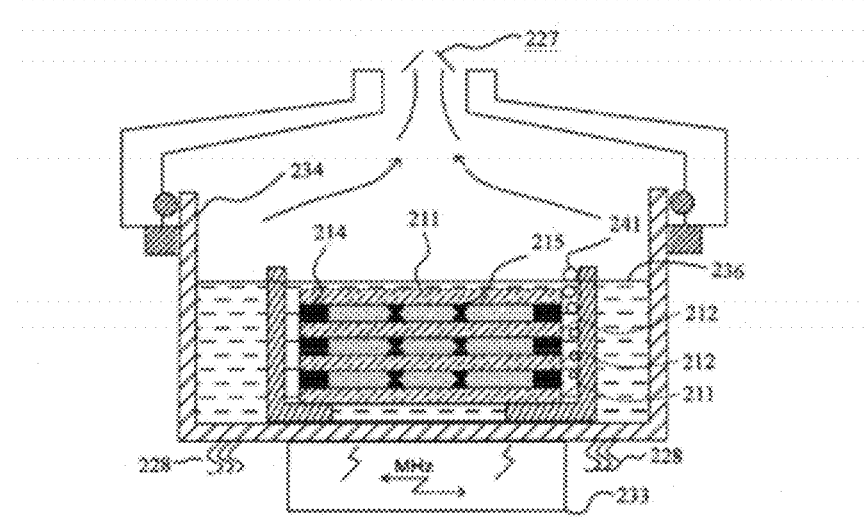
FIG. 11 is a side view of a leading tank for stacking a supercapacitor in an ultrasonic, heating or vacuum pumping mechanism in accordance with the invention.
Figure 12:
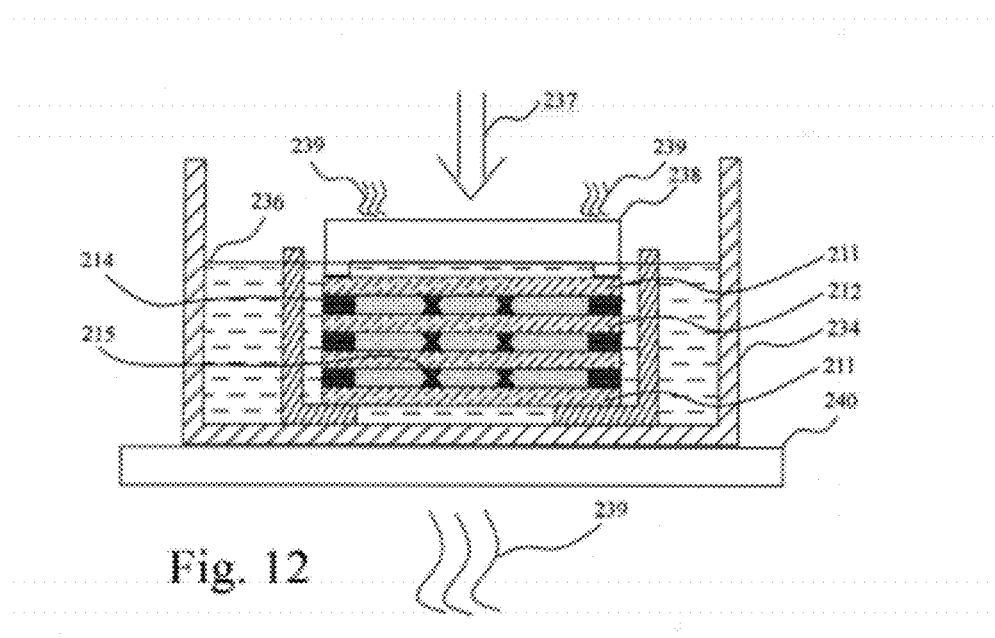
FIG. 12 is a side view of a laminating mechanism in a state of having not laminated a supercapacitor in accordance with the invention.
Figure 13:
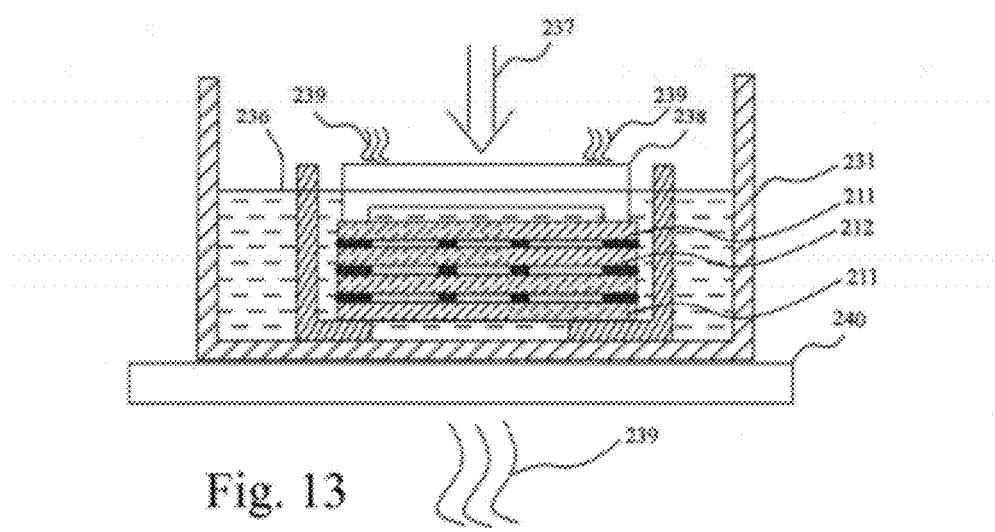
FIG. 13 is a side view of a laminating mechanism in a state of laminating a supercapacitor in accordance with the invention.

FIG. 10 is a side view of an ultrasonic, heating or vacuum pumping tank of the invention. FIG. 11 is a side view of a leading tank for stacking a supercapacitor in an ultrasonic, heating or vacuum pumping mechanism in accordance with the invention. FIG. 12 is a side view of a laminating mechanism in a state of having not laminated a supercapacitor in accordance with the invention. FIG. 13 is a side view of a laminating mechanism in a state of laminating a supercapacitor in accordance with the invention.

Referring to FIG. 10, the supercapacitor in accordance with one of the first through sixth embodiments can be stacked with a supporting frame 232 and immersed in a glass tank 230 or other various ultrasound transparent tanks accommodating an electrolyte 229, and then the glass tank 230 can be placed in an ultrasonic oscillator 233 accommodating pure water 231.

Next, a trace of air 241 remaining in clearances in the supercapacitor in accordance with one of the first through sixth embodiments can be expelled by an ultrasound, by vacuum pumping 227 or by heating 228. After the trace of air 241 remaining in clearances in the supercapacitor is expelled, the supporting frame 232 can be removed. Thereby, assembling the supercapacitor in accordance with one of the first through sixth embodiments can be finished, as shown in FIG. 11.

Referring to FIG. 12, the well-stacked supercapacitor together with an electrolyte tank 234 accommodating an electrolyte 236 can be placed over a bottom laminating plate 240, and then a top laminating plate 238 can be put over the topmost electrode substrate of the supercapacitor. Next, for laminating the supercapacitor in accordance with one of the first through sixth embodiments, a pressure 237 can be applied by a laminating mechanism (not shown).

When the supercapacitor in accordance with one of the first through sixth embodiments is being laminated, a suitable pressure can be applied to the top laminating plate 238 so as to laminate the supercapacitor. In order to shorten lamination time and improve laminate effects, both heating 239 in a temperature between a room temperature and 150 degrees Celsius and laminating can be employed to bond the insulating glue between the electrode substrates, as shown in FIG. 13.

Thereby, the electrolyte in the supercapacitor can be accommodated in spaces enclosed by the opposite surfaces of each stacking portion of the well-laminated electrode substrates and each insulating ring. The finished supercapacitor can be one in accordance with one of the first through sixth embodiments.

The present invention is directed to a supercapacitor and method for forming the same. Electrode substrates in a horizontal arrangement compose the supercapacitor having a polarity in series, and thus the supercapacitor has a reduced height. Minimization of products can be achieved. Electrode substrates in a vertical arrangement compose the supercapacitor having a polarity in single, series or parallel such that the supercapacitor in parallel connection has a reduced equivalent series resistance, and the supercapacitor in series or parallel connection has an increased output voltage or current.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

REFERENCE NUMERALS 40 supercapacitor
42 first electrode substrate
43 active material
44 second electrode substrate
46 middle electrode substrate
47 electrolyte
48 series connection electrode substrate
50 insulating ring
60 supercapacitor
62 first electrode substrate
64 second electrode substrate
66 series connection electrode substrate
68 series connection electrode substrate
70 series connection electrode substrate
100 supercapacitor
102 first electrode substrate
104 second electrode substrate
106 second electrode substrate
108 middle electrode substrate
120 supercapacitor
122 first electrode substrate
200 screen
202 pattern
211 electrode substrate
212 electrode substrate
214 insulating ring
215 support
220 insulating glue
221 air suction port
222 positioning pin
223 air suction jig
224 scraping mechanism
225 scraping plate
226 electrode substrate
227 vacuum pumping
228 heating
229 electrolyte
230 glass tank
231 pure water
232 supporting frame
233 ultrasonic oscillator
234 electrolyte tank
236 electrolyte
237 pressure
238 top laminating plate
239 heating
240 bottom laminating plate
241 air
300 supercapacitor
302 first electrode substrate
304 series connection electrode substrate
306 series connection electrode substrate
308 series connection electrode substrate
310 series connection electrode substrate
312 second electrode substrate
314 series connection electrode substrate
316 series connection electrode substrate
318 series connection electrode substrate
320 series connection electrode substrate
400 supercapacitor
402 electrode substrate
404 electrode substrate
406 electrode substrate
408 electrode substrate
410 middle electrode substrate
C1 supercapacitor
C2 supercapacitor
Cn supercapacitor

What is claimed is:

1. A supercapacitor comprising:
    a first electrode substrate having a surface coated with an active material;
    a second electrode substrate having a surface coated with the active material, wherein the first electrode substrate has a polarity reverse to that of the second electrode substrate;
    a series connection electrode substrate having a surface coated with the active material, wherein the first and second electrode substrates are arranged horizontally and stacked with the series connection electrode substrate;
    a first middle electrode substrate having top and bottom surfaces coated with the active material and stacked between the first electrode substrate and the series connection electrode substrate; and
    a second middle electrode substrate having top and bottom surfaces coated with the active material and stacked between the second electrode substrate and the series connection electrode substrate,
    wherein the first electrode substrates, the first middle electrode substrate and the series connection electrode substrate include stacking portions each having opposite surfaces arranged with a frame-shaped insulating ring, wherein the electrolyte is accommodated in spaces enclosed by the opposite surfaces of each stacking portion of the first electrode substrates, the first middle electrode substrate and the series connection electrode substrate and each insulating ring,
    wherein the second electrode substrates, the second middle electrode substrate and the series connection electrode substrate include stacking portions each having opposite surfaces arranged with a frame-shaped insulating ring, wherein the electrolyte is accommodated in spaces enclosed by the opposite surfaces of each stacking portion of the second electrode substrates, the second middle electrode substrate and the series connection electrode substrate and each insulating ring, wherein the first and second electrode substrates and the first and second middle electrode substrates each has a surface area equal to a half of a surface area of the series connection electrode substrate.

2. A supercapacitor comprising:

a first electrode substrate having a surface coated with an active material;

a second electrode substrate having a surface coated with the active material, wherein the first electrode substrate has a polarity reverse to that of the second electrode substrate; and multiple series connection electrode substrates each having a surface coated with the active material, wherein the first and second electrode substrates are stacked with partial regions of two of the series connection electrode substrates, wherein two of the series connection electrode substrates have partial regions stacked with each other and extend in longitudinal directions vertical to each other or in the same one, wherein the first and second electrode substrates and the series connection electrode substrates include stacking portions each having opposite surfaces arranged with a frame-shaped insulating ring, wherein an electrolyte is accommodated in spaces enclosed by the opposite surfaces of each stacking portion of the first and second electrode substrates and the series connection electrode substrates and each insulating ring.

3. The supercapacitor of claim 2, wherein at least one middle electrode substrate is stacked between the first electrode substrate and one of the series connection electrode substrates, between the second electrode substrate and one of the series connection electrode substrates and between the series connection electrode substrates stacked with each other, and has top and bottom surfaces coated with the active material, wherein the first and second electrode substrates, the at least one middle electrode substrate and the series connection electrode substrates include stacking portions each having opposite surfaces arranged with the frame-shaped insulating ring, wherein the electrolyte is accommodated in spaces enclosed by the opposite surfaces of each stacking portion of the first and second electrode substrates, the at least one middle electrode substrate and the series connection electrode substrates and each insulating ring.

* * * * *